(12) United States Patent
Jørgensen et al.

(10) Patent No.: US 7,866,258 B2
(45) Date of Patent: Jan. 11, 2011

(54) APPARATUS FOR CONTROLLING THE COMPOSITION OF GASES WITHIN A CONTAINER

(75) Inventors: Gert Jørgensen, Aabenraa (DK); Richard D. Schmidt, Gråsten (DK)

(73) Assignee: Maersk Container Industri A/S, Tinglev (DK)

( * ) Notice: Subject to any disclaimer, the term of this patent is extended or adjusted under 35 U.S.C. 154(b) by 1189 days.

(21) Appl. No.: 10/559,858

(22) PCT Filed: Jun. 10, 2004

(86) PCT No.: PCT/DK2004/000404

§ 371 (c)(1),
(2), (4) Date: Mar. 21, 2006

(87) PCT Pub. No.: WO2004/107868

PCT Pub. Date: Dec. 16, 2004

(65) Prior Publication Data

US 2006/0162577 A1    Jul. 27, 2006

(30) Foreign Application Priority Data

Jun. 10, 2003   (NZ) .................................. 523094

(51) Int. Cl.
| | |
|---|---|
| A23B 7/144 | (2006.01) |
| A23B 7/148 | (2006.01) |
| B65D 88/74 | (2006.01) |
| B65D 81/20 | (2006.01) |
| A23L 3/3409 | (2006.01) |
| A23L 3/3418 | (2006.01) |

(52) U.S. Cl. ............................. 99/468; 99/473; 99/467

(58) Field of Classification Search ............ 99/326–340, 99/352–355, 357, 467–479, 516–536, 485–489; 426/418–419, 520–523, 106–118, 415, 395, 426/112; 206/525, 521.8; 220/912, 573.1
See application file for complete search history.

(56) References Cited

U.S. PATENT DOCUMENTS 4,963,165 A    10/1990   Blume et al.

(Continued)

FOREIGN PATENT DOCUMENTS

EP    0 551 158 A1    7/1993

(Continued)

OTHER PUBLICATIONS

WO 91/11913 Dalgleish et al., Aug. 1991.*

(Continued)

*Primary Examiner*—Reginald L Alexander
(74) *Attorney, Agent, or Firm*—Brinks Hofer Gilson & Lione

(57) ABSTRACT

The invention relates to an apparatus for controlling the composition of gases within a cargo container. The apparatus includes at least one sensor, at least one controller and at least one gas permeable membrane being adapted to facilitate the passage there through of different molecules at different rates. Said membrane defining a first region and a second region, the first region being for holding cargo and the second region defining a gas buffer region, said at least one inlet and/or outlet being in communication with said buffer region. The invention further relates to a container.

25 Claims, 3 Drawing Sheets

U.S. PATENT DOCUMENTS

| | | | |
|---|---|---|---|
| 5,120,329 A | | 6/1992 | Sauer et al. |
| 5,355,781 A | | 10/1994 | Liston et al. |
| 5,437,837 A | | 8/1995 | Olson et al. |
| 5,623,105 A | | 4/1997 | Liston et al. |
| 5,692,634 A | * | 12/1997 | Jenkins et al. ............ 220/256.1 |
| 5,791,236 A | | 8/1998 | Schouten |
| 5,872,721 A | | 2/1999 | Huston et al. |
| 5,960,708 A | * | 10/1999 | DeTemple et al. ............. 99/472 |
| 6,013,293 A | * | 1/2000 | De Moor .................... 426/106 |
| 6,092,430 A | | 7/2000 | Liston et al. |
| 6,190,436 B1 | | 2/2001 | Ji et al. |
| 6,376,032 B1 | | 4/2002 | Clarke et al. |
| 6,410,465 B1 | | 6/2002 | Lim et al. |
| 6,447,826 B1 | * | 9/2002 | Matthews ................... 426/126 |
| 6,730,874 B2 | * | 5/2004 | Varriano-Marston ... 219/121.71 |
| 6,840,982 B2 | | 1/2005 | Kunstadt et al. |
| 7,083,818 B2 | * | 8/2006 | Pratte ......................... 426/394 |
| 7,329,452 B2 | | 2/2008 | Clarke et al. |
| 7,340,995 B2 | * | 3/2008 | Chiang et al. ................. 99/467 |
| 7,523,718 B2 | * | 4/2009 | Torring et al. ............... 119/203 |

FOREIGN PATENT DOCUMENTS

| | | |
|---|---|---|
| EP | 0 611 037 A1 | 8/1994 |
| EP | 0 888 804 A2 | 1/1999 |
| JP | 01-273515 | 11/1989 |
| WO | WO 95/22729 | 8/1995 |
| WO | WO 97/02758 | 1/1997 |
| WO | WO 99/12735 | 3/1999 |
| WO | WO 2004/107868 A1 | 12/2004 |

OTHER PUBLICATIONS

Bondar, V.I. et al.; "Gas Sorption and Characterization of Poly(ether-$b$-amide) Segmented Block Copolymers;" Journal of Polymer Science: Part B: Polymer Physics, vol. 37, 2463-2475 (1999).

Bondar, V.I. et al.; "Gas Transport Properties of Poly(ether-$b$-amide) Segmented Block Copolymers;" Journal of Polymer Science: Part B: Polymer Physics, vol. 38, 2051-2062 (2000).

Kim, J. H. et al.; "Gas permeation of poly(amide-6-$b$-ethylene oxide) copolymer," Journal of Membrane Science 190 (2001) 179-193.

Liu, L. et al.; "Preparation of hollow fiber poly(ether block amide)/polysulfone composite membranes for separation of carbon dioxide from nitrogen;" Chemical Engineering Journal 105 (2004) 43-51.

Vigild, M. E. et al. "Selvorganiserende polymerer—skabeloner til nanoporøse materialer" [Self-organizing polymers—templates for nanoporous materials]; Polymerkemi; Dansk Kemi, 85, No. 11, 2004 (translation).

International Search Report dated Nov. 21, 2007, for International Application No. PCT/DK2007/000369.

International Search Report dated Oct. 7, 2004 for International Application No. PCT/DK2004/000404.

International Preliminary Report on Patentability dated Sep. 26, 2005 for International Application No. PCT/DK2004/000404.

* cited by examiner

APPARATUS FOR CONTROLLING THE COMPOSITION OF GASES WITHIN A CONTAINER

This application is the National Stage of International Application No. PCT/DK2004/000404 filed Jun. 10, 2004, which claims priority to New Zealand Application NZ 523094, filed Jun. 10, 2003, these references are incorporated herein in their entirety.

TECHNICAL FIELD

The invention relates to an apparatus for controlling the composition of gases. Preferably the present invention may be adapted to provide an apparatus for a container where such an apparatus is preferably adapted to control the composition of gases within a container. Reference throughout this specification will be made to the present invention being used to control the composition of gases within containers, but those skilled in the art should appreciate that other applications are also envisioned for the present invention.

BACKGROUND ART

The use of shipping or transportation containers is well known for the transport of products and commodities over long distances. To extend or otherwise preserve the shelf life of such transportable products the shipping containers are normally equipped with some form of temperature regulation system, such as a refrigeration system.

Instances in which the products to be transported are perishable goods, such as fruit and/or vegetables, transport containers may also incorporate a system adapted to modify the composition of the refrigerated air surrounding the stored contents. As fresh fruit and vegetables represent active biological systems the atmosphere of a container will constantly change as gases and moisture are produced by the metabolic processes (such as respiration) occurring within the biological systems present. Furthermore, the shelf life of a lot of shipped produce is highly dependent on the composition of gases within a container where the optimal gaseous composition of a storage container is highly dependent on the specific produce being stored.

By incorporating an atmospheric modification or control system into a transport container the respiration rates of the stored produce and the gases present within a container may be regulated, thereby providing an effective means for prolonging the shelf life of the container contents in addition to the refrigeration of the air. In particular, the respiration rates of stored produce may be retarded by controlling the mix and/or volumes of oxygen, carbon dioxide and nitrogen within the container.

Furthermore, a container may provide an environment suitable for the growth of spoilage microorganisms and the proliferation of insects and other pests. To counter such activity systems normally rely on the use of chemicals to eliminate pathogen and insect damage to stored produce. The use of atmosphere control systems adapted to control respiration may also inhibit pathogen production and kill insects, and therefore contribute to a reduction in the number and quantity of chemicals, being applied to reduce or eliminate such damage to stored produce. For example, trials have demonstrated that the greatest impact on insect proliferation within a container may be achieved by maintaining reduced levels of oxygen for extended periods of time, which leads to oxygen deprivation in insect body tissue.

A common approach used in shipping containers to increase the shelf life of produce stored is to create an "ideal" or optimum storage atmosphere (that is different from that of ambient air) at the beginning of the storage period and maintaining that atmosphere. In some cases containers are initially flushed to remove or add gases resulting in an internal gas composition around the stored produce that is different from that of ambient air. Once the oxygen content of the gases within a container drops further as a result of respiration, inlets may be opened to allow fresh air into the container, thereby delivering oxygen into the container. Such systems often rely on the use of membranes or films which are adapted to prevent the movement of gases into or out of the container, and such systems are commonly referred to as Modified Atmosphere (MA) systems.

However, by ventilating the container with fresh air and letting out the container air, the composition of the gas in the container will over time eventually result in a gas composition in which the carbon dioxide and oxygen content (as a sum proportion of container gases) approaches approximately 21%. Such a proportion of carbon dioxide and oxygen is not necessarily an optimal environment for the storage of certain products. If the container is not initially flushed, the sum of oxygen and carbon dioxide will always remain approximately 21%.

Although such systems may be relatively inexpensive to integrate into a container they are not Well suited to adequately controlling and maintaining optimum levels of carbon dioxide within a container, where such optimum levels often differ from those levels of carbon dioxide present in ambient air.

Moreover, the sum proportion of carbon dioxide and oxygen in a container will always remain approximately 21% unless the composition of either the outgoing and/or ingoing air is actively and effectively manipulated to thereby change this sum proportion (of 21%) as necessary. Other methods, for example the use of carbon dioxide absorbent lime, can be used to actively and selectively remove gases from the cargo space of a container. However, such methods have disadvantages including the disposal of used lime and ineffective control.

An alternative approach is to provide a container having concentrations of oxygen and/or carbon dioxide that are different from that of ambient air and regularly measuring and actively maintaining those concentrations during a storage period. In particular, such systems will typically maintain low levels of oxygen and higher levels of carbon dioxide (compared to ambient air) so that the levels of respiration occurring within stored produce may be controlled. To effectively gauge the concentrations and/or volumes of oxygen and other gases within a container such a system may often utilize sensor technology which is located within a container and is adapted to actively assess the gaseous composition inside a container. These systems are commonly referred to as Controlled Atmosphere (CA) systems.

Such Controlled Atmosphere (CA) systems arc adapted to ensure that the appropriate remedial action is taken to ensure that the gaseous composition of a container is maintained, or returned to an optimal level when deviation occurs. To ensure optimal levels of gases are maintained (usually this involves reduced oxygen levels and increased carbon dioxide levels) many Controlled Atmosphere (CA) systems are provided with a filter adapted to compress and separate the components of incoming air. In this way, as air is directed into a container excess oxygen may be prevented from entering the container, which is desirable as it will ensure the retardation of respiratory activity within the container.

Use of Controlled Atmosphere (CA) systems will enable a container to maintain the optimal gas composition specifically suited to the produce and/or goods contained within where such a gas composition may be actively controlled throughout the period of storage.

Whilst such a system may effectively control and maintain optimal conditions that will contribute to longevity of stored produce such systems are extremely expensive to manufacture and maintain. Moreover, these systems tend to be very complicated and typically demand the services of a skilled and specialized work force to ensure they are adequately maintained.

The provision of an improved control system which can actively monitor the composition of gases in a container and provide an optimal environment for the storage of container contents would be of advantage.

The provision of a system able to effectively control the flow of gases into and/or out of a container to thereby promote a gaseous atmosphere in a container which will prolong the shelf life of stored produce would be of advantage. The provision of such a system which is both relatively inexpensive to produce and maintain would be advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address at least some of the foregoing problems or at least to provide the public with a useful choice.

Further aspects and advantages of the present invention will become apparent from the ensuing description which is given by way of example only.

DISCLOSURE OF INVENTION

According to one aspect of the present invention there is to provide an apparatus for controlling the composition of gases within a container, said container including a plurality of walls, and at least one inlet and/or outlet, the apparatus including at least one sensor, at least one controller and at least one gas permeable membrane being adapted to facilitate the passage there through of different molecules at different rates, said membrane defining a first region and a second region, the first region being for holding cargo and the second region defining a gas buffer region, said at least one inlet and/or outlet being in communication with said buffer region.

A membrane may be defined as a thin barrier and such a permeable membrane is adapted to facilitate the transportation of different molecular species through the barrier (membrane) at different rates. Furthermore, the permeation of materials through the membrane may be driven by the relative material concentrations, partial pressure and/or polarity differentials of the molecules which are applied to sides of the membrane. Preferable at least one container wall is adapted to locate said membrane.

According to further aspect of the present invention there is provided an apparatus for controlling the composition of gases within a container substantially as described above wherein at least one of said at least one inlet and one outlet includes a valve.

According to a further aspect of the present invention there is provided an apparatus substantially as described above which includes at least two inlets and/or two outlets.

According to a further aspect of the present invention there is provided an apparatus substantially as described above wherein the gas permeable membrane is selectively permeable.

According to another aspect of the present invention there is provided an apparatus substantially as described above wherein a valve is adapted to open when activated by the controller to provide a passage through which gases flow into and/or out of the container.

According to a further aspect of the present invention there is provided an apparatus substantially as described above wherein the controller is adapted to open a valve when the volume or concentration of gas within the container reaches or falls to a specified level.

According to a further aspect of the present invention there is provided an apparatus substantially as described above wherein the container is a building.

According to a further aspect of the present invention there is provided an apparatus substantially as described above wherein the building is a cool store.

The present invention is adapted to provide an apparatus. This apparatus may control and/or regulate the gas composition within a region or enclosure.

In a further preferred embodiment the present invention may be adapted to provide an apparatus for a transportation or shipping container. These types of containers allow large volumes of products or other materials to be stored securely and transported long distances easily. To increase the shelf life of the stored products in some instances it is also preferable to regulate and control the temperature and/or the volumes and/or concentrations of gases within the container (for reasons discussed above).

However, in alternative embodiments present invention need not adapted to provide a apparatus for an enclosure such as a shipping or transportation container. For example, in alternative embodiments the apparatus may be adapted for use within any number or varieties of areas adapted for the storage of produce, such as a cool store. Those skilled in the art should appreciate that applications and/or locations for the present invention are also envisioned and reference to shipping and/or transportation containers only throughout this specification should in no way be seen as limiting.

Preferably a container which the present invention is adapted to be used with may include a plurality of walls.

In a further preferred embodiment the container may be substantially rectangular in shape and include two side wails, a roof, floor, rear wall (which also doubles as a door or entrance into the interior of the container) and a front wall.

Reference throughout this specification will also be made to a container employed in conjunction with the present invention including two side walls only adjacent to a set of rear and front walls. However, those skilled in the art should also appreciate that the specific arrangement of walls in such a container may vary in other instances, and reference to the above only throughout this specification should in no way be seen as limiting.

Preferably a container which the present invention is adapted to be used with may include at least one inlet and one outlet. An inlet may provide a passage or channel through which fresh air or other gases may flow into the container. Similarly, the provision of an outlet may provide a means for the evacuation of gases from regions within a container—that is, a means for enabling gases to flow out of the container.

In a further preferred embodiment a container which the present invention is adapted to be used with may include at least two inlets and/or two outlets.

In a further preferred embodiment the inlet(s) and/or outlet(s) may include a valve. For the purposes of this specification a valve may be considered to be any device which is configured to regulate and/or control the flow of a gases or fluids.

Such a device may be adapted to open to permit the flow of gases into and/or out of a container. Similarly, such a valve may be adapted to close to prevent the flow of gases into/or out of the container. The provision of such a valve(s) at or near the container inlet(s) and/or outlet(s) will enable the flow of gases into and/or out of the container to be effectively controlled and/or regulated.

The composition of gases within a container may reach levels not suited to preserving the shelf life of the stored products. For example, during the respiration of stored products (such as vegetables and/or fruits) within a container the build-up of undesirable volumes and/or concentrations of carbon dioxide may occur. In such instances a valve located at an outlet may be activated to open, thereby allowing carbon dioxide to be evacuated from the container, and oxygen to be let into the container. Alternatively or in addition to the above, a valve located at an inlet may be opened to allow the flow of fresh air (or other gases) into the container to thereby drive, for example carbon dioxide out of the container and increase the oxygen volumes and/or concentrations within same.

In a further preferred embodiment an inlet may be joined with an outlet to provide a bidirectional flow means. In such an embodiment a single bidirectional flow means may be adapted to facilitate gas flow out of or into the container. Such a flow means may include a single valve which may be appropriately opened or closed as necessary to facilitate the flow of gases with respect to the container.

Reference throughout this specification will however be made to a container which the present invention is adapted to be used with incorporating one bi-directional flow means located at the rear of the container and one bi-directional flow means located at the front of the container, and each of said bi-directional flow means including one valve. However, those skilled in the art should appreciate that other configurations of the present invention are envisioned and reference to the above only throughout this specification should in no way be seen as limiting.

Preferably the apparatus may include at least one sensor. A sensor, and more preferably a gas sensor may be appropriately positioned in a container so that some of a property of the container and/or its contents can be sensed. Moreover, a sensor may be exposed to container gases such that a reading or value reflecting the gas composition within the container may be obtained. Gas composition may be considered throughout this specification to be a generic term reflecting the volumes, concentrations and/or ratios of gases within a container.

For example, a sensor may be adapted to sense the volumes and/or concentrations of container gases such as oxygen, carbon dioxide, water vapor, ethylene and/or nitrogen. Furthermore, a sensor may be adapted to output the readings obtained. Such outputted values may be digital or analogue values, voltages or amplitude values.

In a further preferred embodiment the sensor(s) may be integrated within a container refrigeration unit. This will place the sensors in a secure position out of the way of any cargo to be stored in the container. By appropriately positioning the sensors in such a way within the container the gas composition of the container may be effectively sensed.

In a further preferred embodiment the apparatus may include at least two sensors. For example, one sensor may be located within the refrigeration unit of a container and be adapted to sense the gas composition of the front section or compartment of a container, whilst a second sensor may be located substantially near the doors, or rear of a container and be adapted to sense the gas composition of the rear section of the container.

Reference throughout this specification will now be made to the use of two gas sensors being located within a container and being independently adapted to sense the composition of container gases at the front and rear of a container—and more specifically, the oxygen and carbon dioxide component of container gases. However, in alternative embodiments any number or variety of sensors may be used to obtain measures (such as volumes and/or concentrations) of the gas composition at locations within a container. For example, such measures may be obtained through the use of optical sensors, conductivity probes, biosensors or high performance liquid chromatography technologies appropriately set up and positioned to sense the gas composition within a container. Those skilled in the art should appreciate that other methods of assessing the gas composition within a container are also envisioned and reference to the use of two gas sensors being located within a container and being adapted to obtain a reading of the volumes, concentrations and/or ratios of container gases only throughout this specification should in no way be seen as limiting.

Preferably an apparatus formed in accordance with the present invention includes a controller. A controller may be preferably adapted to open or close a valve when the concentration of a specified gas within the container reaches or falls to a specified level.

The controller of the present invention may be formed from or incorporate a computer system or software. Those skilled in the art should appreciate that a computer system may be formed from a programmable logic unit or other processing device on which computer software may be run. Computer software may be considered throughout the present invention to be a set of instructions able to be interpreted by a computer system and capable of performing a task.

In a further preferred embodiment a valve may be adapted to open when activated by the controller to provide a passage through which gases may flow into and/or out of the container.

The combined proportions of carbon dioxide and oxygen in ambient air is about twenty-one percent (21%). However, such a ratio or composition of carbon dioxide and oxygen often does not suit or provide an optimal environment for enhancing the shelf life of a lot of stored products.

In addition, during normal aerobic respiration quantities of oxygen will be used up and replaced by carbon dioxide (and increased levels of water vapor). In a closed environment, such as a sealed container, the shelf life of perishable goods have been shown to be negatively effected, that is fruit and vegetables stored in oxygen deficient environments for prolonged periods of time will deteriorate and/or rot. Such a phenomenon is considered to be the result of the onset of anaerobic respiration, the by-products of which are more carbon dioxide and also alcohols and acetaldehydes. These byproducts may quickly accumulate to toxic levels causing browning and death of fruit and vegetable tissue. Accordingly, to prolong the shelf life of stored goods it is considered necessary to ensure the availability of optimal concentrations and/or volumes of oxygen within the container.

Therefore, as the levels of oxygen fall within the container the controller may be adapted to send an instruction to activate a valve (associated with bidirectional flow means, and inlet, or an outlet) to enable fresh air to flow into the container via an inlet. Conversely, as the fresh air is flowing into the container volumes of carbon dioxide may be evacuated from the container via an outlet located within same.

Accordingly, to enhance the longevity of stored produce it becomes necessary to manipulate the composition of container gases such that ratio or sum proportions of carbon dioxide and oxygen differ from that of ambient air (that being approximately 21%).

Preferably the apparatus may include at least one membrane. A membrane may be preferably located by at least one wall of a container and may be adapted to affix to the interior of a container so as to divide said container into at least two sections. For example, a membrane affixed to the side walls, the roof and the floor of a container may effectively divide the container into two compartments, a first compartment being located substantially near the front of the container, and a second compartment being located substantially near the rear or door end of the container.

In a further preferred embodiment a polymeric film adapted for use with the apparatus may be selectively more permeable to carbon dioxide gas than to oxygen gas. Such selectively permeable membranes are well known in the field and may, for example, be formed as a polyethylene, silicone rubber, CA, PP, PELD, PEHD, EVA, poly 4-methyl-pentene 1, polyethylenterephthalat and/or polybutadiene membrane.

By appropriately locating and positioning the polymeric film with respect to the container walls, a region of the container may be effectively blocked off to create a separate gas buffering region or compartment which is preferably located substantially near the back or door end of the container. Specifically, the film may be positioned to affix to the base and roof of the container, as well as the two sidewalls of the container. Accordingly, once positioned the film will effectively divide the container into two regions, the first region being adapted as a storage compartment and being located near the front of the container, and the second being adapted as a gas buffer region being located at the rear of near the door end of the container.

In a further preferred embodiment the polymeric film may be located substantially near the rear of the container. In such an embodiment the gas buffer region may therefore be located near the rear of the container. Furthermore, such a polymeric film may be located to provide a void or buffering region around at least one bi-directional flow means which is adapted to control the flow of air into the buffer region (from outside the container) and the flow of gases out of the buffer region both into the storage compartment and completely out of the container.

However, in alternative embodiments the gas permeable polymeric film may be located or positioned in any number of orientations with respect to the container and need not be located substantially near the rear of the container so as to divide the container into two compartments. For example, the gas permeable polymeric film may be shaped as a bag or box. By shaping the gas permeable polymeric film as a bag or box, the buffer region can be made as an independent or replaceable unit, which can be located on either the exterior or the interior of a container it can even be located on the exterior side as well as the interior side of a container. In alternative embodiments a container may include two, three or more membranes which may be positioned to divide the container into three, four or more regions. In addition, a membrane adapted for use with the present invention may be formed from any number or varieties of materials which exhibit gas or fluid permeable and/or selectively permeable characteristics. Those skilled in the art should appreciate that other locations for a permeable membrane and quantities and characteristics of a membrane are also envisioned and reference to the above only throughout this specification should in no way be seen as limiting.

Preferably the gas permeable film may be adapted to facilitate the flow of carbon dioxide from the cargo compartment (or front region) of the container to the gas buffer region (or rear region) of the container. As discussed above, normal aerobic respiration requires the availability of oxygen and produces carbon dioxide as a waste product. The effective disposal of this waste product is essential as above specific threshold levels, high carbon dioxide concentrations in a container combined with low levels of oxygen may result metabolic imbalances in perishables that result in internal damage of the goods.

However, at optimal levels the concentration carbon dioxide may serve as an inhibitor to respiratory activity of perishables. Furthermore, an optimal composition of carbon dioxide within a container, in combination with an optimal oxygen composition, may cause the perishables stored to exist in a near dormant state the consequence of which shows natural ripening and allows crops to be harvested closer to ripeness or to be exposed to extended transportation periods.

The composition of carbon dioxide typically increases within the cargo region of the container (due to normal respiration of produce stored). Such carbon dioxide may therefore be adapted to flow through the permeable membrane from the cargo storage compartment into the gas buffer region, thereby reducing the volume of carbon dioxide within the cargo region.

The flow of carbon dioxide from the cargo region to the gas buffer region will continue as long as the concentration of carbon dioxide within the cargo region remains higher than that of the gas buffer region. Once the concentration of carbon dioxide within the cargo region equals that within the gas buffer region an equilibrium will be reached—that is, the flow of carbon dioxide through the permeable membrane will cease.

In a further preferred embodiment the gas permeable film may be adapted to facilitate the flow of oxygen from the gas buffer region (or rear region) of the container to the storage compartment (or front region) of the container. In particular, the selectively permeable polymeric membrane may allow oxygen to flow through it, provided that the direction of such flow is opposite to that of the carbon dioxide.

In a further preferred embodiment a sensor located within the container may be adapted to sense the concentrations and/or volumes of carbon dioxide within the cargo storage compartment of a container.

A sensor may be appropriately positioned to illicit the concentrations of carbon dioxide within the various regions of a container. In particular, a sensor may be able to detect or sense when carbon dioxide levels within the cargo region are at a level indicative of respiratory activity has taken place within the container. In such instances the sensor may send a signal (such as a digital or analogue signal, or a voltage or amplitude value) to the controller which is adapted to activate a valve controlling a bi-directional flow means such that an outlet located in the gas buffer region may open, thereby evacuating the carbon dioxide from that region and allowing carbon dioxide to continue to flow through the membrane.

Preferably a bi-directional flow means located near the rear of the container may open to allow air to flow into the buffer region. In such instances there will be a reduction in the composition of carbon dioxide within buffer region and an increased oxygen concentration within same.

As volumes of carbon dioxide are produced in the cargo region and passed across the membrane into the buffer region (and then expunged out of the container via the bidirectional flow means) the pressure within the cargo region will be reduced as the volumes of both the oxygen and carbon dioxide diminish.

Accordingly, and in a further preferred embodiment the controller may activate a valve controlling a bi-directional flow means to open an inlet so that air may flow into the cargo region of the container. As the oxygen concentration within the container diminishes (as a result of normal aerobic respiration) or as the pressure operating within the cargo region diminishes an inlet located within the cargo compartment of the container may be opened to supply a quantity of fresh air into the container.

The operation of such an inlet may be controlled by the controller which receives signals from a sensor adapted to sense the oxygen and/or carbon dioxide composition within a container.

Accordingly, by appropriately opening and closing container inlet(s) and outlet(s) the composition of gases within the container can be controlled. Such operation may be enabled using a controller and may be facilitated by a number of sensors which are adapted to detect the composition of gases within a container.

In addition, the provision of a selectively permeable membrane adapted to affix to the interior of the container will enable evacuation of carbon dioxide from the cargo region of the container into a gas buffer region. The gas buffer region can similarly be evacuated by operation of a bi-directional flow means operating as an outlet which may open and close to regulate the flow of air into the buffer region (from outside the container).

The invention in other aspect provides containers as recited in the claims.

The present invention provides numerous advantages over the prior art control systems.

The provision of an effective yet cost efficient system adapted to regulate the composition of gases within a container is of advantage.

The ability of the present invention to be effectively integrated and installed into existing containers for a fraction of the cost of the prior art controlled atmosphere (CA) systems is of advantage.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
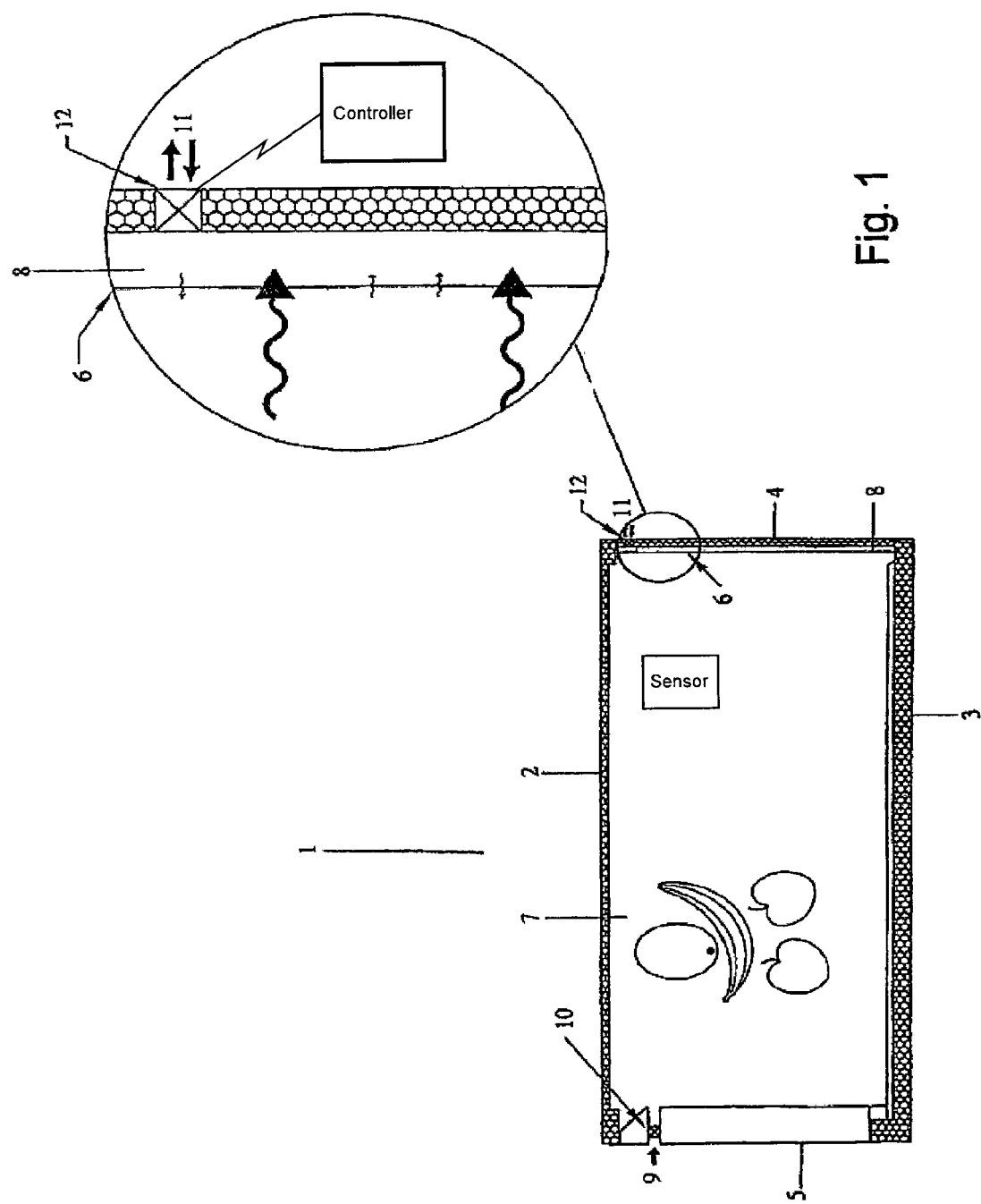
FIG. 1 shows a side view of an apparatus formed in accordance with a preferred embodiment.

FIG. 1 shows a side view of an apparatus formed in accordance with a preferred embodiment.

FIG. 1 shows a container 1 which has elements of a apparatus installed as configured in accordance with a preferred embodiment of the present invention. The container 1 includes a roof 2, floor 3, two side walls (not shown), rear wall 4 (formed as a door) and a front wall 5.

Also shown is membrane 6 which is formed as a gas permeable plastic film. The membrane 6 is adapted to affix to the side walls, roof 2 and floor 3 of the container 1 to divide the container 1 into a storage region 7 and gas buffer region 8. Membrane 8 is configured to have greater permeability to carbon dioxide than to other gases that exist within container 1 (for example, oxygen, nitrogen, ethylene).

Also shown is bi-directional flow means 9 which includes valve 10 and is adapted to open to facilitate gas flows into or out of the container air into the cargo region 7 of the container. In addition, bidirectional flow means 11 is shown which serves as an inlet and outlet and is adapted under the operation of valve 12 to facilitate the flow of air into and/or out of gas buffer region 8.

In the embodiment shown, as the composition of carbon dioxide within the storage area 7 rises (for example, as a result of normal respiration), volumes of the carbon dioxide produced are conveyed via the membrane 6 to gas buffer region 8. Membrane 6 operates as a selectively permeable membrane having a greater permeability to carbon dioxide than to other gases prevailing in the container 1.

Cargo storage region 7 also includes a sensor (not shown) which is adapted to poll the interior of the container to assess the composition of gases within the container. As the volume of oxygen decreases (as a result of normal aerobic respiration) within storage region 7 the sensor (not shown) will detect this occurrence and send an appropriate signal to a controller (not shown) which will activate valve 10 to open flow means 9. By opening inlet 9 air will be supplied into the storage area 7, thereby increasing the oxygen content of same.

The composition of carbon dioxide typically increases within the storage region 7 of the containers 1 due to normal respiration of perishables stored in the container. Such carbon dioxide will flow through the permeable membrane 6 into the gas buffer region 8, thereby reducing the volume and/or concentrations of carbon dioxide within the storage region 7.

Sensors appropriately located in the container are able to detect or sense when carbon dioxide levels within cargo region 7 and/or the gas buffer region 8 are at allowable levels. When the levels of carbon dioxide within the cargo region 7 and/or gas buffer region 8 get too high a sensor will send a signal to the controller to activate valve 12 (associated with bi-directional flow means 11) to open which will facilitate the ingress of fresh air into the gas buffer region 8 as necessary and the evacuation of carbon dioxide from same.

As the concentration of carbon dioxide within the buffer region 8 falls below the concentration of carbon dioxide within the storage region 7 the flow of carbon dioxide from the storage region 7 through the permeable membrane into the buffer region 8 will proceed, thereby reducing the composition of carbon dioxide within the storage region 7.

Therefore, use of the system in container 1 will effectively manipulate the composition of gases within the container 1 such that the sum proportion of carbon dioxide and oxygen in the container may be varied from 21%. In particular the outgoing and/or ingoing air may be actively manipulated through the opening and/or closing of inlets and outlets which effectively control gas flows into and/or out of container 1 which facilitates the change in this sum proportion (of 21%) as necessary.

In effect, the above system provides an improved control system which can actively monitor the composition of gases in container 1 and provide an environment which can be optimized for the storage of container content.

Figure 2:
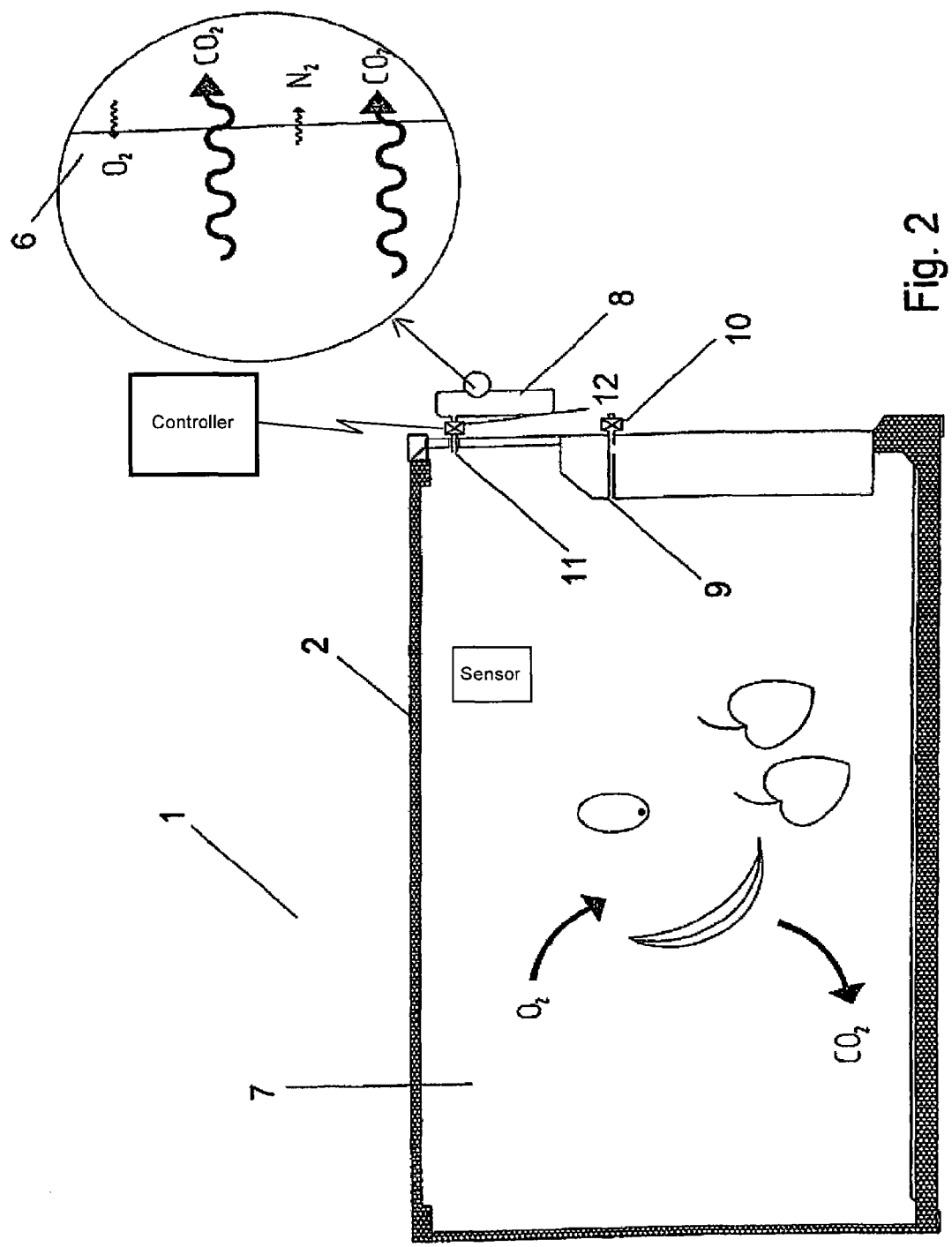
FIG. 2 shows a container with a buffer region/zone located outside a container and FIG. 3 shows a container with a buffer region/zone located inside a container.
Figure 3:
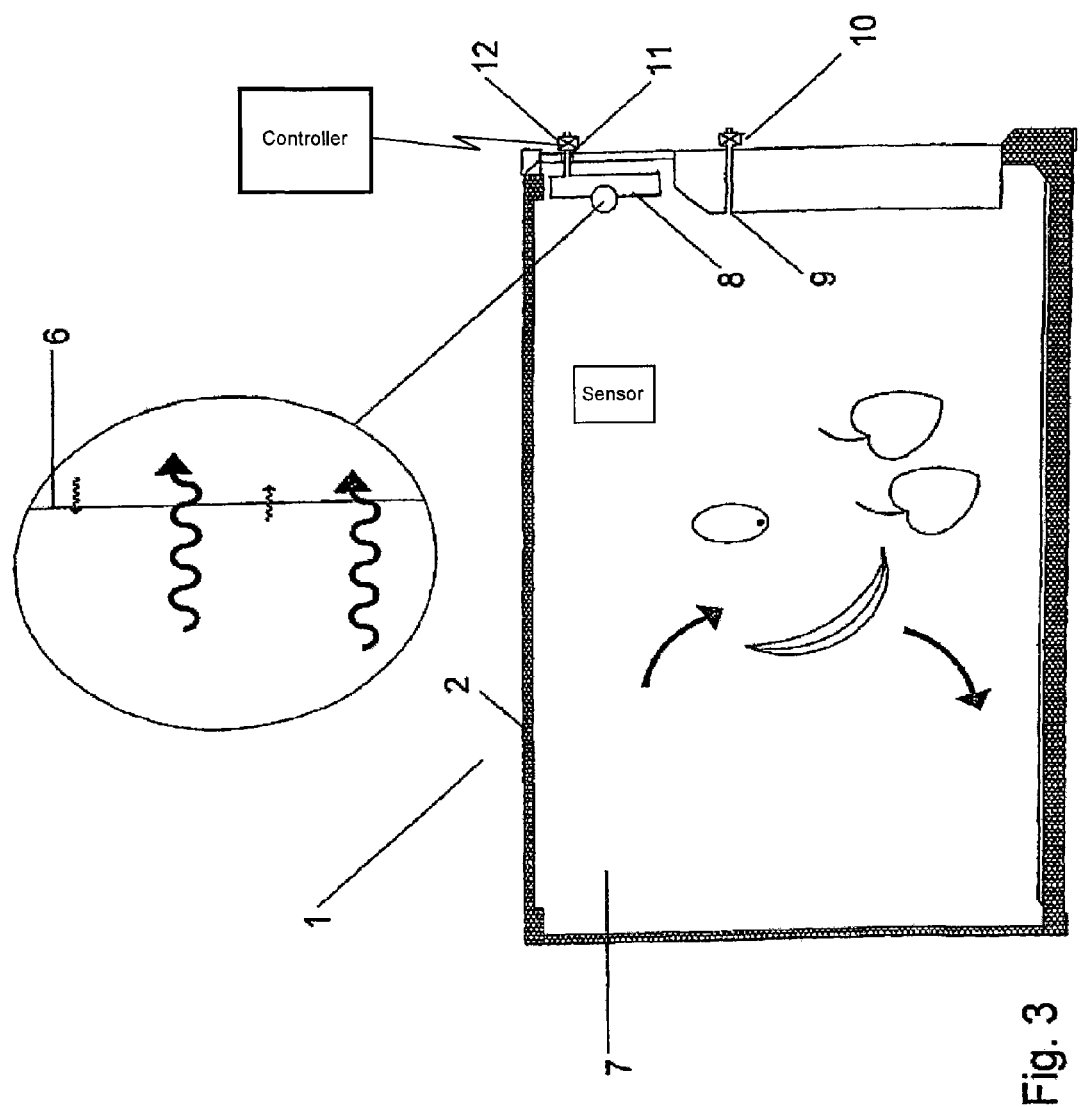

Referring to FIGS. 2 and 3, instead of having the membrane 6 adapted to affix to the side walls, roof and floor of the container as described with reference to FIG. 1, the apparatus being a replaceable unit comprising a buffer region 8 which includes a selectively permeable membrane 6 either situated inside the container as showed in FIG. 2 or outside the container as showed in FIG. 3.

Furthermore, the system is able to effectively control the flow of gases into and/or out of a container to thereby promote a gaseous atmosphere in a container which will prolong the shelf life of stored produce—wherein the system provided is both relatively inexpensive to produce and maintain.

Aspects of the present invention have been described by way of example only and it should be appreciated that modifications and additions may be made thereto without departing from the scope thereof.

The invention claimed is:

1. An apparatus for controlling the composition of gases within a container,
    said container including a plurality of walls and an opening selected from the group consisting of at least one inlet, at least one outlet, or combinations thereof,
    the apparatus including at least one sensor, at least one controller, and at least one gas permeable membrane to facilitate passage there through of different molecules at different rates,
    said at least one gas permeable membrane defining a first region and a second region, said first region forming a storage compartment for holding cargo within said plurality of walls and said second region defining a substantially closed gas buffer region with an opening there through that includes a valve configured to selectively allow a flow of gas out of the gas buffer region,
    wherein said at least one sensor is positioned within said second region and is configured to communicate with said at least one controller to enable control of a composition of gas within said first region.

2. An apparatus according to claim 1, wherein said container comprises at least two openings selected from the group consisting of at least two inlets, at least two outlets, or combinations thereof.

3. An apparatus according to claim 1, wherein said membrane is selectively permeable.

4. An apparatus according to claim 1, wherein said controller is adapted to open the valve when a concentration or volume of gas within said container reaches or falls to a specified level.

5. An apparatus according to claim 1, wherein said container is a building.

6. An apparatus according to claim 5 wherein said building is a cool store.

7. An apparatus according to claim 1, said apparatus adapted for a transportation or shipping container, said container being substantially rectangular in shape and including two side walls, a roof, a floor, a rear wall and a front wall where the rear wall provides access into an interior of the container.

8. An apparatus according to claim 1, wherein said combination of inlet and outlet provides a bi-directional flow means.

9. An apparatus according to claim 1, wherein said container comprises at least one bi-directional flow means located at the rear of the container and at least one bi-directional flow means located at the front of the container, and each of said bi-directional flow means includes one valve.

10. An apparatus according to claim 1, wherein said membrane is formed from a polymeric film, which is adapted for gas permeation.

11. An apparatus according to claim 10, wherein said polymeric film is more permeable to carbon dioxide gas than to oxygen gas.

12. An apparatus according to claim 10, wherein said polymeric film is affixed to at least a portion of a base, a roof and two sidewalls of said container, said polymeric film dividing said container into said first and second regions, said first region located near the front of said container, and said second region being adapted as a gas buffer region located at the rear of said container and near a door end.

13. An apparatus according to claim 10, wherein said polymeric film is located substantially near a rear portion of said container.

14. An apparatus according to claim 10,
    wherein said combination of inlet and outlet provides at least one bi-directional flow means, and
    wherein said polymeric film provides said gas buffer region around said bidirectional flow means which is adapted to control the flow of gas into said gas buffer region and to control the flow of gas out of said gas buffer region both into said storage compartment and completely out of said container.

15. An apparatus according to claim 1, wherein said membrane is adapted to facilitate flow of carbon dioxide gas from said first region of the container to said gas buffer region of the container.

16. An apparatus according to claim 1, wherein said membrane is adapted to facilitate flow of oxygen gas from said gas buffer region of said container to said first region of said container.

17. An apparatus according to claim 1, wherein said membrane is adapted to allow oxygen gas to flow through said membrane in a direction opposite to a carbon dioxide gas flow.

18. An apparatus according to claim 1, wherein said at least one sensor located within said container is adapted to sense concentrations, volumes or concentrations and volumes of carbon dioxide gas, oxygen gas or carbon dioxide and oxygen gases within said first region of said container.

19. An apparatus according to claim 1, wherein said combination of inlet and outlet provides at least one bi-directional flow means, said bi-directional flow means located near a rear end of said container, said bi-directional flow means allowing gas to flow into said gas buffer region when in an open configuration.

20. An apparatus according to claim 1, wherein said combination of inlet and outlet provides at least one bi-directional flow means, said bi-directional flow means located near a rear end of said container, said bi-directional flow means allowing gas to flow into said first region of said container when in an open configuration.

21. An apparatus according to claim 1, wherein said combination of inlet and outlet provides at least one bi-directional flow means, said bi-directional flow means located near a front end of said container, said bi-directional flow means allowing gas to flow into said gas buffer region when in an open configuration.

22. An apparatus according to claim 1, wherein said combination of inlet and outlet provides at least one bi-directional flow means, said bi-directional flow means located near a front end of said container, said bi-directional flow means allowing gas to flow into said first region of the container when in an open configuration.

23. A container comprising:
a plurality of walls and an opening selected from a group consisting of at least one inlet, at least one outlet, or combinations thereof, comprising an apparatus for controlling a composition of gases within the container,
said apparatus including at least one sensor, at least one controller, and at least one gas permeable membrane being adapted to facilitate passage there through of different molecules at different rates,
said at least one gas permeable membrane defining a first region and a second region, said first region forming a storage compartment for holding cargo within said plurality of walls and said second region defining a substantially closed gas buffer region with an opening there through that includes a valve configured to selectively allow a flow of gas out of the gas buffer region,
wherein said at least one sensor is positioned within said second region and is configured to communicate with said at least one controller to enable control of a composition of gas within said first region.

24. A container according to claim 23, wherein said gas buffer region is located on the inside of said container.

25. A container according to claim 23, wherein said gas buffer region is located on the outside of said container.

* * * * *